United States Patent [19]

Tani

[11] 4,250,372
[45] Feb. 10, 1981

[54] PROCESS AND APPARATUS FOR THE HEAT TREATMENT BY HIGH ENERGY BEAMS OF SURFACES OF STEEL PRODUCTS

[75] Inventor: Takayuki Tani, Osaka, Japan

[73] Assignee: Sumitomo Kinzoku Kogyo Kabushiki Gaisha, Osaka, Japan

[21] Appl. No.: 49,639

[22] Filed: Jun. 18, 1979

[30] Foreign Application Priority Data

Jul. 7, 1978 [JP] Japan ................... 53-83328

[51] Int. Cl.³ .................... B23K 27/00; B23K 15/00
[52] U.S. Cl. .................. 219/121 LE; 219/121 LF; 219/121 LQ; 219/121 LR; 219/121 LS; 219/121 LT; 219/121 EG
[58] Field of Search ............... 219/121 LE, 121 LF, 219/121 LQ, 121 LR, 121 LS, 121 LT, 121 EG, 121 EF, 10.59; 148/147; 266/125, 126

[56] References Cited

U.S. PATENT DOCUMENTS

| | | | |
|---|---|---|---|
| 3,593,973 | 7/1971 | Dehn | 148/147 X |
| 4,026,732 | 5/1977 | Dammel et al. | 148/147 X |
| 4,151,014 | 4/1979 | Charschan et al. | 219/121 LF X |

OTHER PUBLICATIONS

E. Locke, et al., *IEEE Journal of Quantum Electronics*, "Metal Processing With A High-Power $CO_2$ Laser", vol. QE-10, No. 2, pp. 179-185, Feb. 1974.
D. Dreger, *Machine Design*, "Pinpoint Hardening By Electron Beam", vol. 50, No. 24, pp. 89-94, Oct. 1978.
E. V. Locke, et al., Research Report 398 Avco Everett Research Laboratory,Inc., "High Power Lasers For Metal Working", pp. 1-39, 1974.

*Primary Examiner*—C. L. Albritton
*Attorney, Agent, or Firm*—Wenderoth, Lind & Ponack

[57] ABSTRACT

A first high energy beam is projected against a first flank surface of a substantially V-shaped steel surface, and simultaneously thereto a second a high energy beam is projected against a second flank surface of the V-shaped surface. The high energy beams may be electron beams or laser beams and may be provided from a single source or separate sources. The separate high energy beams are projected against the respective flank surfaces at angles as close as possible to vertical thereto, thereby subjecting the flank surfaces to a heat treatment to form a hardened layer.

14 Claims, 8 Drawing Figures

PROCESS AND APPARATUS FOR THE HEAT TREATMENT BY HIGH ENERGY BEAMS OF SURFACES OF STEEL PRODUCTS

BACKGROUND OF THE INVENTION

The present invention relates to a method and an apparatus for the heat treatment by high energy beams of surfaces of steel products. More particularly, the present invention is directed to such a method and an apparatus for such treatment of substantially V-shaped steel surfaces of steel products such as racks and gears.

It is known in various technologies that certain uneven surfaces of steel products, such as substantially V-shaped surfaces of steel products such as the teeth of racks and gears, must be treated, normally by a heat treatment, to increase the strength of such surfaces. Current practical industrial methods employed to achieve such strengthening include electromagnetic induction heating, carburizing, etc. However, such known strengthening methods are not altogether satisfactory from the viewpoint of strength, since the crests of such surfaces are generally excessively treated. Additionally, in carrying out such known processes, energy losses are substantial, and considerable distortion of the surfaces during the heat treatment results. Therefore, development work has been attempted to provide new methods for strengthening such surfaces.

Specifically, there have recently been conducted tests to employ electron beams and/or laser beams as sources of heat. Particularly, electron beam technology has already reached the level of practical application for welding. Heat treatment of flat steel surfaces by means of laser beam and/or electron beam technology will likely be achieved more and more in the future. However, the application of such technologies to uneven steel surfaces, such as those of racks and gears, still presents a number of practical problems, and as of yet no thoroughly practical industrial applications have been developed. More particularly, with reference now to FIG. 5 of the drawings, there will be illustrated the result of the heat treatment of a substantially V-shaped steel surface of a rack by means of a high energy beam in the form of a laser beam, such beam being applied to the steel surface in a heretofore known manner. More particularly, as will be apparent in FIG. 5, when the laser beam is projected substantially perpendicularly of the rack, and substantially perpendicularly of the bottom land of the V-shaped surface, the resultant hardened layer of the surface is much thicker at the bottom land of the surface than at the adjacent flank surfaces. This obviously results in an extremely uneven heat treatment, and the actual results of such heat treatment are highly undesirable. More particularly, in order to form hardened layers of desirable thickness on the flank surfaces, dissolution of the bottom land surface is inevitable. On the other hand, to form a hardened layer on the bottom land surface without dissolution thereof, it is virtually impossible to form hardened layers of suitable and sufficient thickness on the flank surfaces.

The above inherent disadvantages of the heat treatment shown in FIG. 5 are particularly inherent when the laser beam has a Gaussian type energy distribution, wherein the energy is highest at the center of the beam and is increasingly lower toward the periphery of the beam. Consequently, the bottom land surface is heated to a much higher extent because the center of the beam with higher energy is projected onto the bottom land surface, while the flank surfaces are heated to a lesser extent by the periphery of the beam containing lower energy.

One previous attempt to solve the above discussed problem involves the use of a laser beam having an even energy distribution throughout the entire beam area, i.e. the use of a so-called "top-hat" type energy distribution. However, even when employing such a beam, it has still not been possible to obtain a desired uniformity of heat treatment of a surface profile as shown in FIG. 5, for the following reasons. That is, and again with reference to FIG. 5, if the angle formed between the flank surfaces is 40°, then the angle of incidence of the laser beam on the bottom land surface is 90°, that is the deviation from a perpendicular angle of incidence is 0°. On the other hand, at a point on one of the flank surfaces, the deviation of the angle of incidence from perpendicular to the flank surface is 70°. It will be apparent therefore that there will be a much higher degree of energy absorption at the bottom land surface than at the flank surfaces.

Moreover, those portions of the laser beam which are projected onto the flank surfaces are repeatedly reflected therefrom and directed toward the bottom land surface, thereby contributing to the further heating of the bottom land surface.

The results of the above phenomenon are that the hardened layer formed (shown by the hatched area in FIG. 5) is relatively thinner at the flank surfaces, i.e. whereat relatively thicker hardened layers are desired, and is thicker at the bottom land surface, i.e. whereat relatively thinner hardened layers are desired. These results have prevented the practical application of high energy beams, such as electron beams and laser beams, to the surface treatment of the surfaces of racks and gears.

SUMMARY OF THE INVENTION

With the above discussion in mind, it is the primary object of the present invention to provide a method and an apparatus for heat treating a substantially V-shaped steel surface of a steel product, such as a gear or a rack, while avoiding the above discussed disadvantages.

A further object of the present invention is to provide such a method and an apparatus whereby it is possible to heat treat substantially V-shaped steel surfaces by means of high energy beams, for example electron beams or laser beams, and to thereby increase the mechanical strength of such surfaces by forming hardened layers of desirable form.

A still further object of the present invention involves the provision of such a method and an apparatus whereby it is possible to vary the energy applied to different areas of a substantially V-shaped steel surface to thereby vary the amount and degree of strengthening thereof.

The above objects are achieved in accordance with one aspect of the present invention by simultaneously projecting a first high energy beam against a first flank surface of a substantially V-shaped surface and projecting a second high energy beam against a second flank surface of the V-shaped surface, and thereby subjecting the first and second flank surfaces to desired degrees of heat treatment to form hardened layers thereof. The first and second high energy beams may be derived from two separate high energy sources. Alternatively, a single high energy source may provide an initial main high energy beam. Such initial high energy beam is divided into two separate parts which form the first and second high energy beams, and such first and second high energy beams may be then directed against the first and second flank surfaces, respectively. The initial main high energy beam may be divided by a first optical device, for example a multi-hedral mirror having first and second reflectors positioned to divide the main high energy beam and to direct the first and second high energy beams in diverging directions. In accordance with a further feature of the invention, second and third optical devices may be positioned in the paths of the first and second high energy beams, to divert such high energy beams toward the first and second flank surfaces, respectively. Such second and third optical devices may each comprise a plane mirror and a convex lens, or alternatively each of the second and third optical devices may comprise a concave mirror.

The high energy beams may comprise laser beams or electron beams.

In one desirable aspect of the present invention, the first and second high energy beams are projected against the first and second flank surfaces, respectively, in directions as close as possible to perpendicular thereto.

In accordance with the present invention, it thereby becomes possible to harden the substantially V-shaped surface to a greater thickness at the outer or crest ends of the flank surfaces than at the bottom land ends thereof.

In accordance with a further feature of the present invention, the multi-hedral mirror forming the first optical device may include means for selectively adjusting the relative angle between the first and second reflectors thereof, such that the first and second high energy beams (particularly laser beams) divided from the initial main energy beam may be directed at desired controlled diverging directions.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

Figure 1:
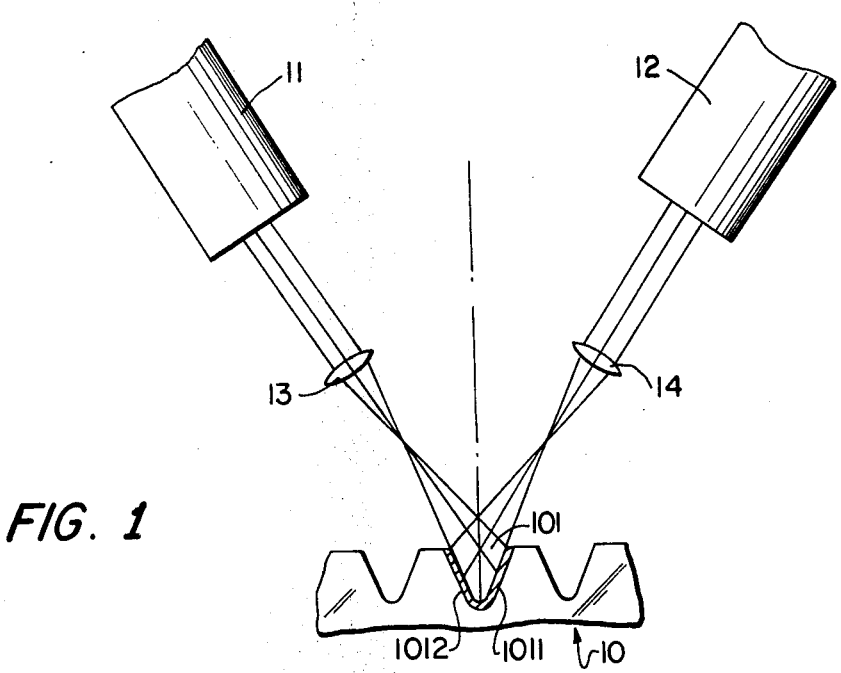
FIG. 1 is a schematic diagram illustrating a first embodiment of the present invention.

With reference now to FIG. 1 of the drawings, a first embodiment of the invention will be described.

A fundamental feature of the present invention involves the simultaneous projection of first and second high energy beams against respective first and second flank surfaces of a substantially V-shaped surface, for example of a rack or a gear, the flank surfaces generally facing each other and being inclined with respect to each other by a specific angle.

As shown in FIG. 1, first and second high energy sources 11 and 12, respectively, are provided. Sources 11 and 12 may be electron beam sources or laser beam sources, but the following description will be made of elements 11 and 12 being laser beam transmitters. Transmitter 11 is positioned to transmit a laser beam against a first flank surface 1011, and transmitter 12 is positioned to project a laser beam against a second flank surface 1012 of a substantially V-shaped surface of a rack 10, the space between the flank surfaces 1011 and 1012 being shown as space 101.

Convex lenses 13 and 14 are positioned in the paths of the respective laser beams, to thereby focus the laser beams. When the high energy beams are electron beams, rather than the laser beams shown in FIG. 1, then the arrangement could include magnetic lenses to achieve convergence of the electron beams. In either case however, the focusing and/or convergent lenses could be eliminated if the cross-sectional size, i.e. diameter, of the high energy beams is of a desired size with respect to the dimensions of the flank surfaces.

Beam transmitters 11 and 12 are positioned symmetrically on opposite sides of a center line through the space 101. Additionally, beam transmitters 11 and 12 are positioned so that the beams projected thereby will be directed against the respective flank surfaces as close as possible to perpendicularly thereto. In other words, it is desired that the beams be directed against the flank surfaces at angles of incidence which deviate as little as possible from the perpendicular. This will provide for a maximum energy absorption. The angles of incidence of the high energy beams to the flank surfaces are dependent on the depth of the space, i.e. the dimension from the outer or crest edge of each flank surface to the bottom land edge of each flank surface, on the angle formed between the flank surfaces, and on the cross-sectional area of the beam, for example the beam diameter.

More particularly, the diameters of the respective beams and their incidence angles on the flank surfaces are determined in such a manner that the first laser beam from first transmitter 11 is projected on the area from the edge of the tooth crest to the bottom land of the flank surface 1011 without being projected on the flank surface 1012. Similarly, the second laser beam from second transmitter 12 is projected on the area from the edge of the tooth crest to the bottom land of the flank surface 1012 without being projected on the flank surface 1011. However, the diameter of a respective beam need not be provided as precisely equal to the dimension between the crest and bottom land of the respective flank surface, since the beam may be allowed to extend somewhat onto the upper or outer flat portion of the tooth crest.

The mode of energy distribution of the first and second laser beams may be either of the Gaussian type or of the "top-hat" type.

If the width, i.e. the dimension perpendicular to the plane of FIG. 1, of rack 10 is larger than the diameter of the projected high energy beam, then projection scanning of the two beams in directions parallel to the width of the rack is required. Furthermore, it will be understood that for the heat treatment of a number of teeth surfaces or spaces of the rack, then the rack will be indexed by one pitch for each heat treatment operation.

The optimum range of energy density of the laser beam at the projection area onto the flank surfaces is $10^2$ to $10^5$ watt/mm$^2$. Accordingly, the output of the laser beam transmitters and the specifications of the optical system are so selected to ensure energy densities within such range. Even further, the projection time of the laser beams and/or the scanning speed thereof are selected so that the temperature of the projected areas on the flank surfaces will exceed the transformation point but not the melting point of the material involved.

Figure 5:
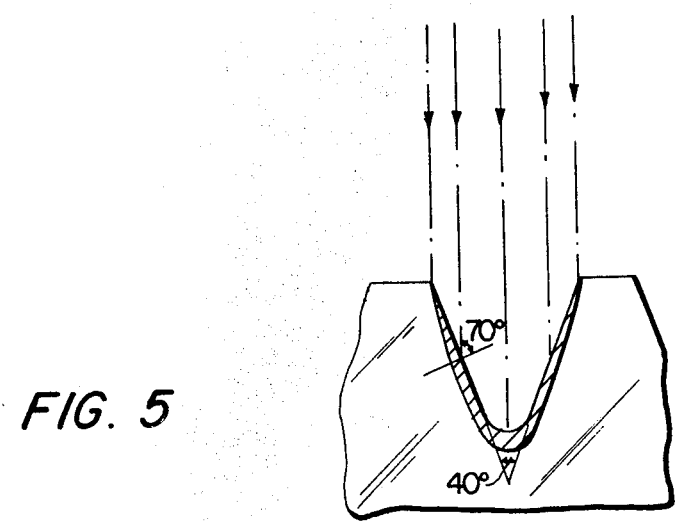
FIG. 5 is a schematic diagram illustrating the application of a high energy beam in a heretofore known manner against a substantially V-shaped surface.

In accordance with the above features of the invention, the energy distribution on the projected areas of the flank surfaces is more uniform than by conventional methods in which a high energy beam is projected onto the flank surfaces at an angle of incidence greatly varying from perpendicular, such as shown in FIG. 5. Accordingly, in accordance with the present invention, the hardened layer on the substantially V-shaped surface of the space 101 is much thicker toward the crest edges of the flank surfaces and is slightly thinner toward the bottom land. This provides the industrially desired distribution of the hardened layer, shown as a hatched area in FIG. 1. As a result, there are obtained steel products of much higher mechanical strength than are possible by conventional methods.

It must be emphasized that the present invention does not involve merely the projection of separate high energy beams on the separate flank surfaces with the beams being directed against the flank surfaces at angles as close as possible to perpendicular thereto. Rather, an important and critical feature of the present invention involves the simultaneous projection of first and second high energy beams onto first and second flank surfaces. To emphasize this criticality, reference will now be made to FIG. 6 which is a microphotograph of a rack, magnified by ten, wherein first and second flank surfaces were treated by first and second high energy beams, but wherein the treatments were separate and not simultaneous.

Figure 6:
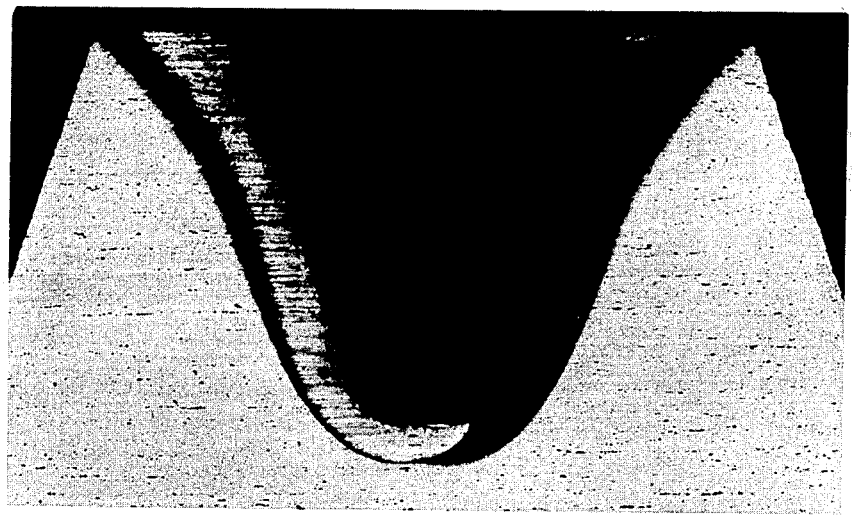
FIG. 6 is an enlarged microphotograph similar to FIG. 3, but showing the undesirable results of nonsimultaneous treatment of the two flank surfaces.

Thus, the product of FIG. 6 was developed by use of the system of FIG. 1, but wherein laser beam transmitter 11 only was first operated to project a first laser beam onto first flank 1011. After termination of the projection of the first laser beam, then the second transmitter 12 was operated to project a second laser beam against second flank surface 1012. The result of this type of treatment was that first flank surface 1011 was overtreated by reflection from the second laser beam. The result was unfavorable from a stength viewpoint, because the surface condition of the flank surfaces after the heat treatment operation was not symmetrical and because overlapping of hardened layers of the first and second operations resulted on the surface of the bottom land. More particularly, in FIG. 6 the black area on the right-hand flank surface is a softened zone which resulted from overheating of the first treated flank surface 1011. Also, the overlapping of the hardened layers at the bottom land is apparent.

On the other hand, in accordance with the present invention wherein the two transmitters 11 and 12 are operated simultaneously, the above disadvantages are completely and totally avoided. This fact is illustrated by FIGS. 3 and 4 which represent microphotographs of surfaces treated in accordance with the arrangement of FIG. 1 of the invention, i.e. wherein transmitters 11 and 12 project laser beams simultaneously against flank surfaces 1011 and 1012, respectively.

Figure 3:
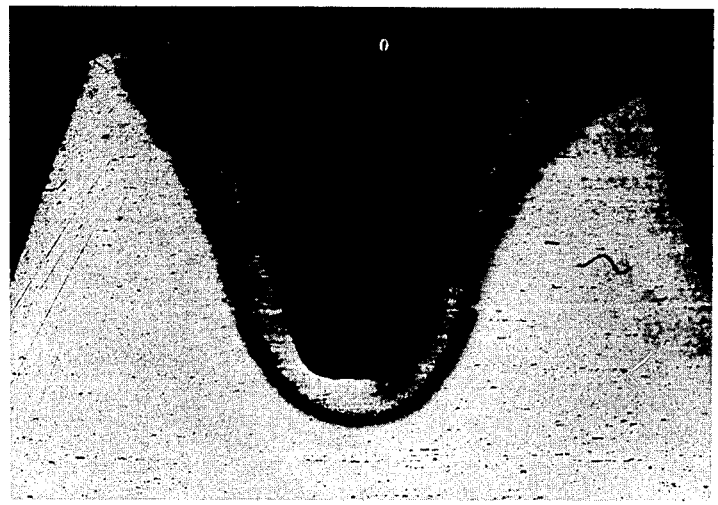
FIG. 3 is an enlarged microphotograph of a surface heat treated according to the embodiment of the invention illustrated in FIG. 1.

Specifically, FIG. 3 is a microphotograph, magnified by a power of ten, similar to FIG. 6. However, FIG. 3 shows that when the two laser beams are projected simultaneously, neither of the flank surfaces becomes overheated. Also, it will be apparent that the hardened layers are thicker toward the outer or crest edges of the flank surfaces and are thinner adjacent the centers of the flank surfaces. Accordingly, the rack or gear produced in accordance with the invention has a very high strength.

Figure 4:
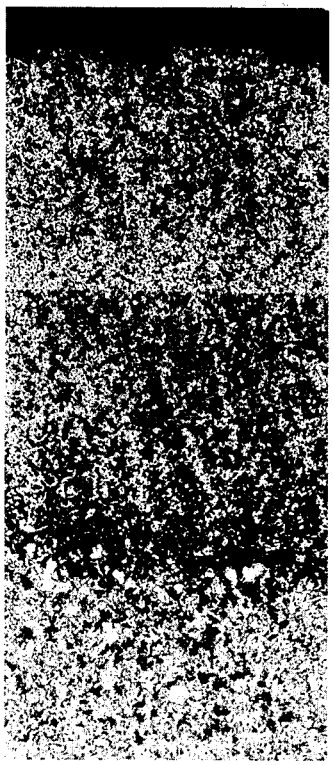
FIG. 4 is a further enlarged microphotograph illustrating the bottom land surface of the treated and hardened surface shown in FIG. 3.

FIG. 4 is a microphotograph of the hardened area of the bottom land of FIG. 3, but magnified by a power of 100, and indicates the complete transformation of the hardened layer into martensite.

More particularly, the rack shown in FIGS. 3 and 4 was treated under the following conditions:

Module of the rack (defined as the tooth pitch/$\pi$) = 2.5

Deviation from the perpendicular of angle of incidence of beams onto respective flank surfaces = 20°

Laser beam transmitters: Two $CO_2$ gas laser beam transmitters, outputs = 1.5 KW, beam diameters = 17 mm$\phi$ Distance from laser beam transmitters to flank surfaces = 235 mm Beam scanning speed = 300 mm/min.

Pretreatment of projected surfaces: Black body treatment to enable black body absorption, i.e. black paint.

As described above, important features of the present invention involve the simultaneous projection of separate high energy beams onto respective flank surfaces of a substantially V-shaped surface of a rack or gear. This was achieved in accordance with the above described embodiment of the present invention by the provision of separate high energy beam sources 11 and 12 to project high energy beams against flank surfaces 1011 and 1012, respectively.

However, in accordance with a further embodiment of the present invention, it is possible to achieve the same desirable results while at the same time reducing the number of necessary beam transmitters and also enabling more easy and accurate control of the transmitted beams. Thus, with reference now to FIG. 2 of the drawings, an embodiment of the invention will be described, wherein it is possible to accurately ensure that the quantity of energy projected by the separate beams is equalized and whereby it is possible to absolutely ensure that the projection of the two beams will be exactly simultaneous.

Figure 2:
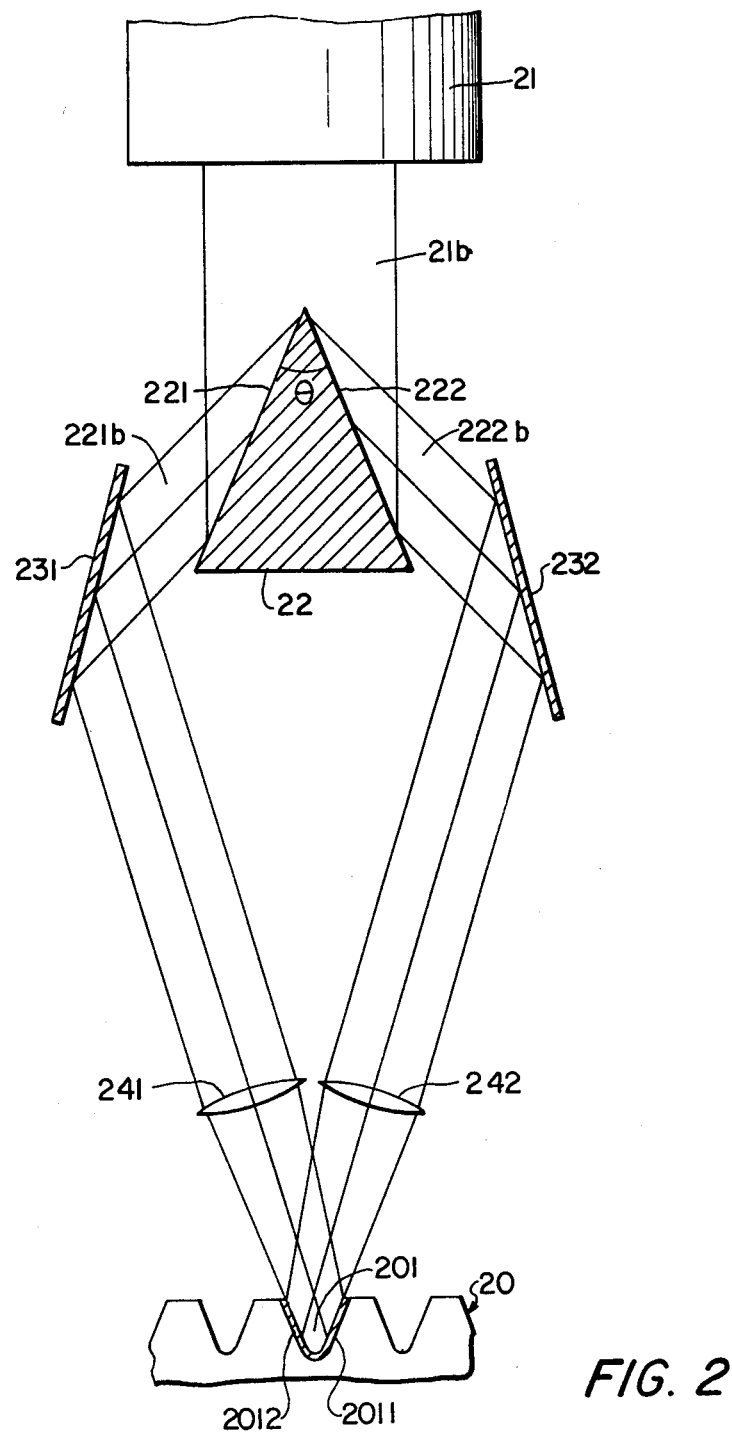
FIG. 2 is a schematic diagram illustrating a second embodiment of the present invention.

Thus, in the arrangement of FIG. 2, a single laser beam transmitter 21 is positioned to direct an initial main laser beam 21b toward a space 201 defined between flank surfaces 2011 and 2012 of a rack 20. A beam splitter device 22, for example a dihedral mirror of a triangular prism with the cross-section of an isosceles triangle has mirror surfaces or reflectors 221 and 222 on respective equilateral sides. Device 22 is positioned so that the intersection of the two reflectors 221 and 222 coincides with a diameter of the laser beam 21b, and such that the angles of incidence of the laser beam 21b on both reflectors 221 and 222 are equal. In other words, device 22 is positioned so that laser beam 21b is equally divided into first and second equal laser beams 221b and 222b, and such that these first and second laser beams are directed away from respective reflectors 221 and 222 at equal angles. Dihedral mirror 22 forms a first optical device. Second and third optical devices are positioned in the paths of first and second laser beams 221b and 222b, respectively, to direct the first and second laser beams against flank surfaces 2011 and 2012, respectively, of rack 20.

In the arrangement illustrated in FIG. 2, each of the second and third optical devices comprises a combination of a plane mirror to deflect the respective laser beam toward the respective flank surface and a convex lens adapted to focus or converge the respective laser beam onto the area of the respective flank surface. Thus, the second optical device for first laser beam 221b comprises a plane mirror 231 and a convex lens 241. Similarly, the third optical device for the second laser beam 222b comprises a plane mirror 232 and a convex lens 242.

It is however to be understood that the second and third optical devices could each be devices other than the illustrated combination of a plane mirror and convex lens. For example, each of the second and third optical devices could be a concave mirror positioned at approximately the same relative position as the illustrated respective plane mirror, and such concave mirror would be effective to deflect and focus the respective laser beam onto the area of the respective flank surface.

In this embodiment of the invention, similarly to the embodiment of the invention described above with reference to FIG. 1, it is necessary that the first and second laser beams be projected onto the first and second flank surfaces 2011 and 2012, respectively, at angles as close as possible to perpendicular thereto. Accordingly, to achieve this desired relationship, the diameter of the initial main laser beam 21b, the angle formed by the reflectors 221 and 222 of the dihedral mirror 22, and the incidence angles of the divided first and second laser beams 221b and 222b onto the plane mirrors 231 and 232, respectively, will be properly selected to achieve the desired angles of incidence onto the respective flank surfaces, dependent upon the flank depth of the space 201 and the angle formed between the flank surfaces of the particular article involved.

In the embodiment of the present invention shown in FIG. 2, both flank surfaces 2011 and 2012 are treated exactly simultaneously and under virtually identical conditions, thereby forming a hardened layer of ideal distribution, i.e. a hardened layer which is thicker toward the outer or crest edges of the flank surfaces and thinner toward the bottom land area. Further, it will be apparent from a consideration of FIG. 2 that if initial main laser beam 21b has an energy distribution of the Gaussian type, then the central part of the initial main laser beam 21b with a high energy density is projected onto the outer or crest ends of the flank surfaces, and the periphery of the initial main laser beam 21b with a lower energy density is projected onto the bottom land of the surface.

Further, in accordance with the embodiment of FIG. 2, the energy distribution of the divided laser beams onto the projected areas of the flank surfaces can be controlled as desired, since the central portion of the initial main laser beam having a higher energy density can be projected onto any desired portions of the areas of the flank surfaces by adjusting the positions of the plane mirrors 231 and 232.

It is further possible in accordance with this embodiment of the present invention to adjust the distribution of energy projected onto the flank surfaces by adjusting the angle $\theta$ between reflectors 221 and 222 of mirror 22. Thus, mirror 22 could readily have incorporated therein means for adjusting the angle $\theta$. This would readily make it possible to adapt the device of FIG. 2 to the treatment of racks or gears having varying depths of space 201 and varying angles between the flank surfaces, while at the same time optimizing the desired energy distribution.

Figure 8:
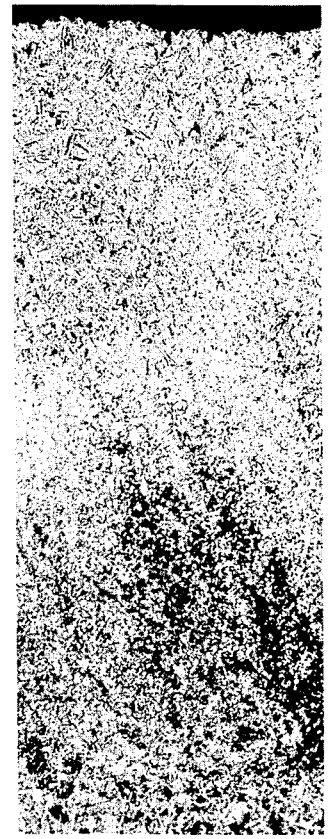
FIG. 8 is a further enlarged microphotograph similar to FIG. 4, but illustrating the condition of the bottom land portion of FIG. 7.
Figure 7:
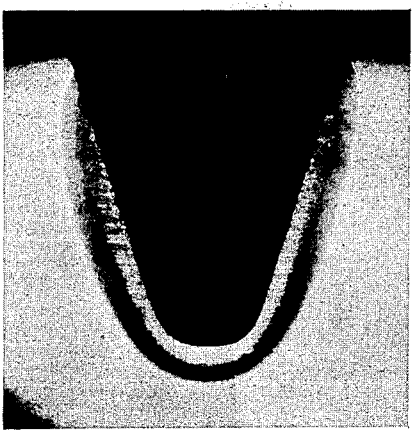
FIG. 7 is a view similar to FIG. 3, but illustrating a surface which is treated and hardened in accordance with the embodiment of the present invention illustrated in FIG. 2.

FIGS. 7 and 8 are microphotographs similar to FIGS. 3 and 4, but illustrating a surface treated by the embodiment of FIG. 2. Such surface was treated under the same conditions as listed above regarding the treatment of the surface illustrated in FIGS. 3 and 4, except that only a single $CO_2$ gas laser beam transmitter was employed, that the distance from the laser beam head of the transmitter 21 was 281.5 mm, and that the beam scanning speed was 130 mm/min.

In accordance with the above described embodiments of the present invention, the treated surfaces resulted in a hardened layer wherein at the bottom land where the hardened layer was relatively thin, there was achieved a Vickers hardness of more than two hundred, and wherein at the outer or crest edges of the flank surfaces there was a Vickers hardness of more than six hundred.

In accordance with the above described embodiments of the present invention, it is possible to obtain heat treatments of steel products by high energy beams providing the effect of self-quenching. Additionally however, in accordance with the present invention it is possible to provide for the formation of a hardened layer having a desired thickness distribution, without obtaining any softened zone due to melting. Accordingly, the present invention provides a substantial improvement in the technology of heat treatment of steel products by high energy beams.

Although the present invention has been described above and illustrated with respect to specific desired operational and structural features, it is to be understood that various modifications may be made thereto without departing from the scope of the present invention.

What I claim is:

1. A method for heat treating a substantially V-shaped steel surface of a steel product such as a gear or a rack, such V-shaped surface being defined by first and second flank surfaces substantially facing each other and inclined with respect to each other by a specific angle, said method comprising:

simultaneously projecting a first high energy beam against a first flank surface of a substantially V-shaped surface and projecting a second high energy beam against a second flank surface of said V-shaped surface, and thereby subjecting said first and second flank surfaces to heat treatment.

2. A method as claimed in claim 1, wherein said first and second high energy beams are derived from two separate high energy sources.

3. A method as claimed in claim 1, wherein said steps of projecting comprise providing an initial main high energy beam from a single high energy source, dividing said initial main high energy beam into two separate parts which comprise said first and second high energy beams, and then directing said first and second high energy beams against said first and second flank surfaces, respectively.

4. A method as claimed in claim 3, wherein said initial main high energy beam is divided by a first optical device, and said first and second high energy beams are directed against said first and second flank surfaces, respectively, by second and third optical devices.

5. A method as claimed in claim 3, wherein said initial main high energy beam is directed by said single high energy source in a direction toward said V-shaped surface, and said initial main high energy beam is divided equally into diverging said first and second high energy beams.

6. A method as claimed in claim 1, wherein said high energy beams comprise laser beams.

7. A method as claimed in claim 1, wherein said high energy beams comprise electron beams.

8. A method as claimed in claim 1, wherein said first and second high energy beams are projected against said first and second flank surfaces, respectively, in directions as close as possible to perpendicularly thereto.

9. A method as claimed in claim 1, wherein said heat treatment comprises hardening said V-shaped surface, and wherein said flank surfaces are hardened to a greater thickness at the outer or crest ends thereof than at the bottom land ends thereof.

10. An apparatus for heat treating a substantially V-shaped steel surface of a steel product such as a gear or a rack, such V-shaped surface being defined by first and second flank surfaces substantially facing each other and inclined with respect to each other by a specific angle, said apparatus comprising:

a single laser beam transmitter means for forming a single main laser beam;

first optical means, positioned in the path of said main laser beam, for dividing said main laser beam into substantially equal first and second laser beams directed in different directions; and second and third optical means, positioned in the paths of said first and second laser beams, respectively, for simultaneously projecting said first and second laser beams against first and second flank surfaces, respectively, of a V-shaped surface to be treated.

11. An apparatus as claimed in claim 10, wherein said first optical means comprises a multi-hedral mirror having first and second reflectors positioned to divide said main laser beam and to direct said first and second laser beams, respectively, in diverging directions.

12. An apparatus as claimed in claim 11, wherein the relative angle between said first and second reflectors is adjustable.

13. An apparatus as claimed in claim 10, wherein each of said second and third optical means comprises a plane mirror and a convex lens.

14. An apparatus as claimed in claim 10, wherein each of said second and third optical means comprises a concave mirror.

* * * * *